United States Patent
Bauer et al.

(10) Patent No.: US 11,084,917 B2
(45) Date of Patent: Aug. 10, 2021

(54) FLAME RETARDANT-STABILIZER COMBINATION FOR THERMOPLASTIC POLYMERS

(71) Applicant: CLARIANT PLASTICS & COATINGS LTD, Muttenz (CH)

(72) Inventors: Harald Bauer, Kerpen (DE); Sebastian Hörold, Diedorf (DE); Martin Sicken, Cologne (DE)

(73) Assignee: Clariant Plastics & Coatings Ltd, Muttenz (CH)

( * ) Notice: Subject to any disclaimer, the term of this patent is extended or adjusted under 35 U.S.C. 154(b) by 0 days.

(21) Appl. No.: 16/333,228

(22) PCT Filed: Sep. 6, 2017

(86) PCT No.: PCT/EP2017/072279
§ 371 (c)(1),
(2) Date: Mar. 14, 2019

(87) PCT Pub. No.: WO2018/050498
PCT Pub. Date: Mar. 22, 2018

(65) Prior Publication Data
US 2019/0225772 A1 Jul. 25, 2019

(30) Foreign Application Priority Data
Sep. 15, 2016 (DE) ............... 10 2016 217 577.7

(51) Int. Cl.
| | | |
|---|---|---|
| C08K 5/5313 | (2006.01) | |
| C08K 3/32 | (2006.01) | |
| C08K 5/3492 | (2006.01) | |
| C08K 5/5317 | (2006.01) | |
| C08K 5/52 | (2006.01) | |
| C08L 77/06 | (2006.01) | |
| C08K 13/04 | (2006.01) | |
| C08L 77/02 | (2006.01) | |
| C08K 5/5333 | (2006.01) | |
| C08K 7/14 | (2006.01) | |

(52) U.S. Cl.
CPC ............ C08K 5/5313 (2013.01); C08K 3/32 (2013.01); C08K 5/34922 (2013.01); C08K 5/34924 (2013.01); C08K 5/34928 (2013.01); C08K 5/5205 (2013.01); C08K 5/5317 (2013.01); C08K 5/5333 (2013.01); C08K 7/14 (2013.01); C08K 13/04 (2013.01); C08L 77/02 (2013.01); C08L 77/06 (2013.01); *C08K 2201/005* (2013.01)

(58) Field of Classification Search
CPC .... C08K 5/5313; C08K 3/32; C08K 5/34922; C08K 5/34924; C08K 5/34928; C08K 5/5205; C08K 5/5317; C08K 5/5333; C08K 7/14; C08K 13/04; C08K 2201/005; C08L 77/02; C08L 77/06
USPC .......................................................... 524/91
See application file for complete search history.

(56) References Cited

U.S. PATENT DOCUMENTS 7,420,007 B2 * 9/2008 Bauer ............... C07F 9/301
252/609
2016/0340588 A1 * 11/2016 Bauer ............... C09K 21/12

FOREIGN PATENT DOCUMENTS

DE 102014001222 A1 * 7/2015 ............ C08K 11/00

* cited by examiner

*Primary Examiner* — Josephine L Chang
(74) *Attorney, Agent, or Firm* — Morgan, Lewis & Bockius LLP

(57) ABSTRACT

The invention relates to a novel flame retardant-stabilizer combination for thermoplastic polymers, comprising, as component A, from 25 to 99.9% by weight of a phosphinic acid salt of the formula (I) wherein $R^1$, $R^2$ are the same or different and are each $C_1$-$C_8$-alkyl, linear or branched, $C_6$-$C_{18}$-aryl, $C_7$-$C_{18}$-arylalkyl or $C_7$-$C_{18}$-alkylaryl, or $R^1$ and $R_2$ form one or more rings with each other, M is Mg, Ca, Al, Sb, Sn, Ge, Ti, Zn, Fe, Zr, Ce, Bi, Sr, Mn, Li, Na, K and/or a protonated nitrogen base; m is from 1 to 4; as component B, from 0 to 75% by weight of a synergist or of a phosphorus/nitrogen flame retardant and, as component C, from 0.1 to 30% by weight of telomeric phosphinic acid salts as component D, from 0 to 20% by weight of organo phosphonic acid salt, as component E, from 0 to 5% by weight of phosphonic acid salt, the sum of the components always being 100% by weight, and wherein the angle of repose of said flame retardant-stabilizer combination is between 5° and 45°.

(I)

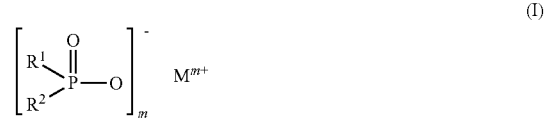

10 Claims, No Drawings

FLAME RETARDANT-STABILIZER COMBINATION FOR THERMOPLASTIC POLYMERS

The present invention relates to a flame retardant-stabilizer combination for thermoplastic polymers with good flowability and to flame retardant polymeric molding compositions which comprise such flame retardant-stabilizer combinations.

The present invention belongs to the technical field of flame retardants, and more particularly flame retardant-stabilizer combination having a good fluidity.

For thermoplastic polymers in particular, salts of phosphinic acids (phosphinates) have been found to be effective flame-retardant additives (DE-A-2 252 258 and DE-A-2 447 727).

Moreover, synergistic combinations have been found of phosphinates with certain nitrogen compounds and are more effective as flame retardants in a whole series of polymers than the phosphinates alone (PCT/EP97/01664 and also DE-A-197 34 437 and DE-A-197 37 727).

DE-A-196 14 424 describes phosphinates in combination with synergists in polyesters and polyamides. DE-A-199 33 901 describes phosphinates in combination with melamine polyphosphate as a flame retardant for polyesters and polyamides.

WO-A-2004022640 describes flame retardant combinations for thermoplastics, said flame retardant combinations, in addition to flame retardancy, exerting a stabilizing action on the plastic.

The shortcomings of the above described methods are that if flowability of dialkylphosphinic salt is poor, uneven distribution of the flame retardant polymeric molding compositions may occur which can have negative consequences on the flame retardant properties of the flame retardant polymeric molding compositions.

CN-A-104059101A describes the advantageous effect of adding process aids to the production of dialkylphosphinic acid salts on the flowability, namely the angle of repose. The shortcoming of this method is that the addition of process aids to the production can have wide spread negative consequences on other product properties, adds a lot of more complexity to the production process and can even contribute security hazards.

Surprisingly, it was found that addition of a small amount of additives can have advantageous effects on the flowability of the flame retardant without the need to change the whole production process. Furthermore the possibility to use the additive in different amounts offers great flexibility in choosing the desired flowability.

It is therefore an object of the present invention to provide flame retardant combinations for thermoplastics, said flame retardant combinations, in addition to flame retardancy, exerting high flowability. This object is achieved by the addition of telomeric phosphinic acid salts, organo phosphonic acid salts and/or phosphonic acid salts to phosphinic acid salts.

The obtained flame retardant-stabilizer combination of the present invention is prepared by adding one or more components defined above to phosphinic acid salts. The flame retardant-stabilizer combination according to the present invention shows a high flowability, and the angle of repose is up to 5°-45°, so that it can fundamentally solve the problems of poor flowability and uneven distribution of flame retardants in resins.

The invention therefore provides a flame retardant-stabilizer combination for thermoplastic polymers, comprising, as component A, from 25 to 99.9% by weight of a phosphinic acid salt of the formula (I)

wherein
R$^1$, R$^2$ are the same or different and are each C$_1$-C$_{18}$-alkyl, linear or branched, C$_6$-C$_{18}$-aryl, C$_7$-C$_{18}$-arylalkyl or C$_7$-C$_{18}$-alkylaryl, or R$^1$ and R$^2$ form one or more rings with each other,
M is Mg, Ca, Al, Sb, Sn, Ge, Ti, Zn, Fe, Zr, Ce, Bi, Sr, Mn, Li, Na, K and/or a protonated nitrogen base;
m is from 1 to 4;
as component B, from 0 to 75% by weight of a synergist or of a phosphorus/nitrogen flame retardant and,
as component C, from 0.1 to 30% by weight of telomeric phosphinic acid salts
as component D, from 0 to 20% by weight of organo phosphonic acid salt,
as component E, from 0 to 5% by weight of phosphonic acid salt, the sum of the components always being 100% by weight, and wherein the angle of repose of said flame retardant-stabilizer combination is between 5° and 45°.

Preferable, the angle of repose of said flame retardant-stabilizer combination is between 20° and 40°.

R$^1$, R$^2$ are preferably the same or different and are each methyl, ethyl, n-propyl, isopropyl, n-butyl, tert-butyl, n-pentyl, 2-pentyl, 3-pentyl, 2-methylbutyl, 3-methylbutyl (isomentyl), 3-methylbut-2-yl, 2-methylbut-2-yl, 2,2-dimethylpropyl (neopentyl), hexyl, heptyl, octyl, nonyl, decyl, cyclopentyl, cyclopentylethyl, cyclohexyl, cyclohexylethyl, phenyl, phenylethyl, methylphenyl and/or methylphenylethyl.

M is preferably a calcium, aluminum, zinc, titanium or iron ion.

Component B preferably comprises one or more of groups a)-e), wherein these groups encompasses
a) condensation products of melamine;
b) reaction products of melamine with polyphosphoric acid and/or reaction products of condensation products of melamine with polyphosphoric acid or mixtures thereof;
c) phosphates of the formulae (NH$_4$)$_y$ H$_{3-y}$ PO$_4$ or (NH$_4$ PO$_3$)$_z$, where y is from 1 to 3 and z is from 1 to 10 000;
d) N-synergists of the formulae (III) to (VIII) or mixtures thereof.

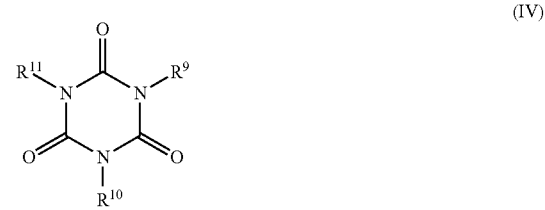

-continued

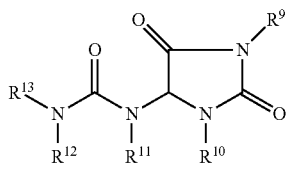
(V)

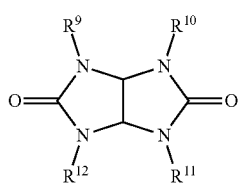
(VI)

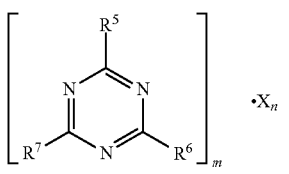
(VII)

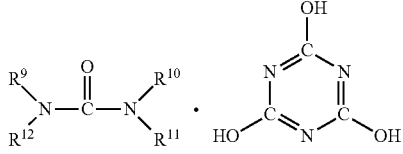
(VIII)

where
R$^5$ to R$^7$ are each hydrogen, C$_1$-C$_8$-alkyl, C$_5$-C$_{16}$-cycloalkyl or -alkylcycloalkyl, possibly substituted by a hydroxyl or a C$_1$-C$_4$-hydroxyalkyl function, C$_2$-C$_8$-alkenyl, C$_1$-C$_8$-alkoxy, -acyl, -acyloxy, C$_6$-C$_{12}$-aryl or -arylalkyl, —OR$^8$ and —N(R$^8$)R$^9$, N-alicyclic or N-aromatic,
R$^8$ is hydrogen, C$_1$-C$_8$-alkyl, C$_5$-C$_{16}$-cycloalkyl or -alkylcycloalkyl, possibly substituted by a hydroxyl or a C$_1$-C$_4$-hydroxyalkyl function, C$_2$-C$_8$-alkenyl, C$_1$-C$_8$-alkoxy, -acyl, -acyloxy or C$_6$-C$_{12}$-aryl or -arylalkyl,
R$^9$ to R$^{13}$ are each the same groups as R$^8$ and also —O—R$^8$,
m and n are each independently of 1, 2, 3 or 4,
X is an acid which can form adducts with triazine compounds (III);
or oligomeric esters of tris(hydroxyethyl) isocyanurate with aromatic polycarboxylic acids;
e) aluminium phosphites.

The invention relates also to a flame retardant-stabilizer combination as claimed in claim 5, wherein
the condensation products a) of melamine are melem, melam, melon and/or more highly condensed compounds thereof;
the reaction products of melamine b) are dimelamine pyrophosphate, melamine polyphosphate, melem polyphosphate, melam polyphosphate, melon polyphosphate and/or mixed polysalts of this type;
the phosphates c) are ammonium hydrogenphosphate, ammonium dihydrogenphosphate and/or ammonium polyphosphate;
the N-synergists d) are benzoguanamine, tris(hydroxyethyl) isocyanurate, allantoin, glycouril, melamine, melamine cyanurate, dicyandiamide and/or guanidine;

the aluminium phosphites e) are of the formula (X), (XI) and/or (XII)

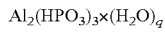
(X)

where
q is 0 to 4

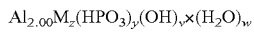
(XI)

where
M are alkali metal ions
z 0.01 to 1.5
y 2.63 to 3.5
v 0 to 2 and
w 0 to 4,

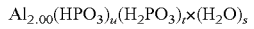
(XII)

where
u is 2 to 2.99
t 2 to 0.01 and
s 0 to 4
and/or mixtures of aluminium phosphite of formula (X) with aluminium salt of limited solubility and nitrogen free ions, mixtures of aluminium phosphite of formula (XII) with aluminium salts, aluminium phosphite [Al(H2PO$_3$)$_3$], secondary aluminium phosphite [Al$_2$(HPO$_3$)$_3$], basic aluminium phosphite [Al(OH)(H$_2$PO$_3$)$_2$*2aq], aluminium phosphite tetrahydrate [Al$_2$(HPO$_3$)$_3$*4aq], aluminium phosphonate, Al$_7$(HPO$_3$)$_9$(OH)$_6$(1,6-hexandiamine)$_{1.5}$*12H$_2$O, Al$_2$(HPO$_3$)$_3$*xAl$_2$O$_3$*nH$_2$O with x=2.27–1, Al$_4$H$_6$P$_{16}$O$_{18}$ and/or mixtures of 0-99.9 wt.-% Al$_2$(HPO$_3$)$_3$*nH$_2$O with 0.1-100 Gew.-% sodium aluminium phosphite.

Preferably the aluminium phosphite is a mixture of 50-99 wt.-% Al$_2$(HPO$_3$)$_3$×(H$_2$O)$_q$ where q is 0 to 4 with 1-50 wt.-% sodium aluminium phosphite.

More preferably the aluminium phosphite is a mixture of 50-99 wt.-% Al$_2$(HPO$_3$)$_3$×(H$_2$O)$_q$ where q is 0 to 4 with 1-50 wt.-% Al$_{2.00}$M$_z$(HPO$_3$)$_y$(OH)$_v$×(H$_2$O)$_w$ (II) where M is sodium, z is 0.005 to 0.15, y is 2.8 to 3.1, v is 0 to 0.4 and w is 0 to 4.

Preferably, component B is melamine polyphosphate.

Preferably, component C is a telomeric phosphinic acid salt of formula (XIII)

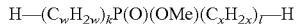
(XIII)

where, in formula (XIII), independently from each other,
k is from 1 to 9,
l is from 1 to 9,
w is from 2 to 9,
x is from 2 to 9,
Me is minimum one of the cations of the group Mg, Ca, Al, Sb, Sn, Ge, Ti, Fe, Zr, Zn, Ce, Bi, Sr, Mn, Li, Na and/or K.

Preferably, in formula (XIII), w and x are from 2 to 4 and k and l are from 1 to 4.

More preferably, in formula (XIII), w and x are from 2 or 3 and k and l are from 1 to 3.

More preferably, in formula (XIII), Me is a cation of the group Al—, Ti—, Fe— and/or Zn.

Preferably, the telomeric phosphinic acid salts are metal salts of ethyl butyl phosphinic acid, dibutyl phosphinic acid, ethyl hexyl phosphinic acid, butyl hexyl phosphinic acid, ethyl octyl phosphinic acid, sec-butyl ethyl phosphinic acid, 1-ethylbutyl-butyl-phosphinic acid, ethyl-1-methylpentyl-phosphinic acid, di-sec-butyl phosphinic acid (di-1-methyl-propyl phosphinic acid), propyl-hexyl phosphinic acid, dihexyl phosphinic acid, hexyl-nonyl phosphinic acid, propyl-nonyl phosphinic acid, dinonyl phosphinic acid, dipropyl phosphinic acid, butyl-octyl phosphinic acid, hexyl-octyl phosphinic acid, dioctyl phosphinic acid, ethyl cyclopentylethyl phosphinic acid, butyl cyclopentylethyl phosphinic acid, ethyl cyclohexylethyl phosphinic acid, butyl cyclohexylethyl phosphinic acid, ethyl phenylethyl phosphinic acid, butyl phenylethyl phosphinic acid, ethyl 4-methylphenylethyl phosphinic acid, butyl 4-methylphenylethyl phosphinic acid, butyl cyclopentyl phosphinic acid, butyl cyclohexylethyl phosphinic acid, butylphenyl phosphinic acid, ethyl 4-methylphenyl phosphinic acid and/or butyl 4-methylphenyl phosphinic acid and wherein the metal is minimum one of the group Mg, Ca, Al, Sb, Sn, Ge, Ti, Fe, Zr, Zn, Ce, Bi, Sr, Mn, Li, Na and/or K.

The invention relates also to a flame retardant-stabilizer combination, comprising as component A, from 70 to 99.99% by weight of a phosphinic acid salt of the formula (I)

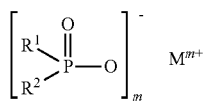

wherein
R$^1$, R$^2$ are the same or different and are each C$_1$-C$_{18}$-alkyl, linear or branched, C$_6$-C$_{18}$-aryl, C$_7$-C$_{18}$-arylalkyl or C$_7$-C$_{18}$-alkylaryl, or R$^1$ and R$^2$ form one or more rings with each other,
M is Mg, Ca, Al, Sb, Sn, Ge, Ti, Zn, Fe, Zr, Ce, Bi, Sr, Mn, Li, Na, K and/or a protonated nitrogen base;
m is from 1 to 4
and, as component C, from 0.01 to 30% by weight of at least one telomeric phosphinic acid salt of the type ethyl butyl phosphinic acid, dibutyl phosphinic acid, ethyl hexyl phosphinic acid, butyl hexyl phosphinic acid, ethyl octyl phosphinic acid, sec-butyl ethyl phosphinic acid, 1 ethylbutyl-butyl-phosphinic acid, ethyl-1-methylpentyl-phosphinic acid, di-sec-butyl phosphinic acid (di-1-methylpropyl phosphinic acid), propyl-hexyl phosphinic acid, dihexyl phosphinic acid, hexyl-nonyl phosphinic acid, propyl-nonyl phosphinic acid, dinonyl phosphinic acid, dipropyl phosphinic acid, butyl-octyl phosphinic acid, hexyl-octyl phosphinic acid, dioctyl phosphinic acid, ethyl cyclopentylethyl phosphinic acid, butyl cyclopentylethyl phosphinic acid, ethyl cyclohexylethyl phosphinic acid, butyl cyclohexylethyl phosphinic acid, ethyl phenylethyl phosphinic acid, butyl phenylethyl phosphinic acid, ethyl 4-methylphenylethyl phosphinic acid, butyl 4-methylphenylethyl phosphinic acid, butyl cyclopentyl phosphinic acid, butyl cyclohexylethyl phosphinic acid, butylphenyl phosphinic acid, ethyl 4-methylphenyl phosphinic acid and/or butyl 4-methylphenyl phosphinic acid, where the metal of said salt is minimum one of the group Mg, Ca, Al, Sb, Sn, Ge, Ti, Fe, Zr, Zn, Ce, Bi, Sr, Mn, Li, Na and/or K;
wherein the component B is different to component A;
wherein the angle of repose of said flame retardant-stabilizer combination mixture is between 5° and 45°.

Preferably, component D is alkyl phosphonate according to formula (II)

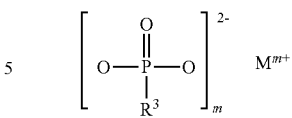

wherein R$^3$ is an ethyl, propyl and/or butyl group, M is Mg, Ca, Al, Zn or Fe and m is from 1 to 4;
Preferably, component E is a phosphite according to formula (IX);

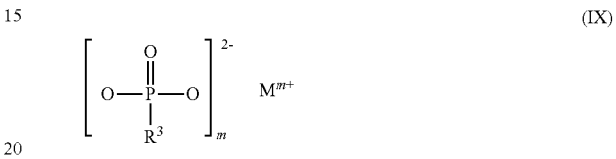

wherein R$^3$ is H, M is Mg, Ca, Al, Zn or Fe and m is from 1 to 4;
The invention relates also to a flame retardant-stabilizer combination as claimed in one or more of claims 1 to 17, wherein from 25 to 99.9% by weight of component A, from 0 to 75% by weight of component B, from 0.1 to 15% by weight of component C, from 0 to 10% by weight of component D and from 0 to 2% by weight of component E are present.

Preferably, in such a flame retardant-stabilizer combination, from 25 to 99.8% by weight of component A, from 0 to 75% by weight of component B, from 0.1 to 10% by weight of component C, from 0.1 to 5% by weight of component D and from 0 to 2% by weight of component E are present.

More preferably, in such a flame retardant-stabilizer combination, from 25 to 99.7% by weight of component A, from 0.1 to 75% by weight of component B, from 0.1 to 10% by weight of component C, from 0.1 to 5% by weight of component D and from 0 to 1% by weight of component E are present.

Preferably, the residual moisture content of said flame retardant-stabilizer combination is between 0.01 wt.-% and 10 wt.-%.

More preferably, the residual moisture content of said flame retardant-stabilizer combination is between 0.1 wt.-% and 1 wt.-%.

Preferably, the particle size of said flame retardant-stabilizer combination is between 1 μm and 100 μm.

Preferably, the bulk density of said flame retardant-stabilizer combination is between 100 g/L and 1000 g/L.

Preferably, the tap density of said flame retardant-stabilizer combination is between 200 g/L and 1100 g/L.

Preferably, the flame retardant-stabilizer combination as claimed in one or more of claims 1 to 25 is used as a flame retardant or as an intermediate for preparation of flame retardants for thermoplastic polymers, for thermoset polymers, for clearcoats, for intumescent coatings, for wood and other cellulosic products, for polymer shaped body, film, thread or fiber, for production of flame-retardant polymer molding compositions, for production of flame-retardant polymer moldings and/or for rendering pure and blended polyester and cellulose fabrics flame-retardant by impregnation.

Preferably, the thermoplastic polymers are polyester, polystyrene and/or polyamide, and the thermoset polymers are unsaturated polyester resins, epoxy resins, polyurethanes and/or acrylates.

The invention also encompasses a flame-retardant plastics molding composition, polymer shaped body, film, thread or fiber comprising the flame retardant-stabilizer combination as claimed in one or more of claims 1 to 25.

Preferably, the plastics used in the flame-retardant plastics molding composition, polymer shaped body, film, thread or fiber, are thermoplastic polymers of the type high-impact polystyrene, polyphenylene ether, polyamides, polyesters, polycarbonates, thermoplastic polyurethanes and blends or polymer blends of the type ABS (acrylonitrile-butadiene-styrene) or PC/ABS (polycarbonate/acrylonitrile-butadiene-styrene) or PPE/HIPS (polyphenylene ether/HI polystyrene) plastics.

Preferred is a flame-retardant plastics molding composition, polymer shaped body, film, thread or fiber which comprises the flame retardant-stabilizer combination in an amount of from 2 to 50% by weight, based on the plastics molding composition.

More preferred is a flame-retardant plastics molding composition, polymer shaped body, film, thread or fiber which comprises the flame retardant-stabilizer combination in an amount of from 10 to 30% by weight, based on the plastics molding composition.

The flame-retardant plastics molding composition, polymer shaped body, film, thread or fiber is preferably used in or for connectors, power wetted parts in current distributors (RCCB), boards, potting compounds, power connectors, circuit breakers, lamp housing, LED housing, condenser housing, bobbins and fans, protection contacts, connectors, in/on circuit boards, casings for connectors, cables, flexible circuit boards, charger for mobile phones, engine covers, textile coatings, moldings in the form of components for the electrical/electronics sector, in particular for parts of printed circuit boards, housings, films, cables, switches, distribution boards, relays, resistors, capacitors, coils, lamps, diodes, LEDs, transistors, connectors, controllers, memories and sensors, in the form of large-area components, in particular housing parts for cabinets and in the form of elaborately designed components with sophisticated geometry.

Telomeric compounds can be formed in the addition of the olefin to the hypophosphite-ion. This includes that not only two molecules olefin are added to one dialkylphosphinate-ion but more than two. One or both of the alkyl chains of the olefin are extended by one or more further olefin units.

Olefins are preferably ethylene, propene, 1-butene, 2-butene, 1-pentene, 1-hexene and 1-octene.

If ethylene is used as olefin in the production of dialkyl phosphinic acid salts the preferred telomeric phosphinic salts are ethyl butyl phosphinic acid, dibutyl phosphinic acid, ethyl hexyl phosphinic acid, butyl hexyl phosphinic acid, ethyl octyl phosphinic acid etc.

Stereochemistry allows the formation of branched alkyl chains, e.g. sec-butyl ethyl phosphinic acid, 1-ethylbutyl-butyl phosphinic acid, ethyl-1-methylpentyl-phosphinic acid, di-sec-butyl phosphinic acid (di-1-methyl-propyl phosphinic acid) etc.

If propene is used as telomeric olefin derivatives are formed in an analog way.

Telomeric phosphinic acid salts are phosphorus containing compounds. Their content is expressed in percent of all constituents which contain phosphorus (P-%). It is measured via $^{31}$P-NMR spectroscopy.

The disclosed telomeric phosphinic acid anions may be preferably built-in into the crystal lattice of a dialkyl phosphinic acid salt.

On the other side, the telomeric phosphinic acid salts and the dialkyl phosphinic acid salts can form a mixture or precipitate.

The synergists are preferably condensation products of melamine (WO-A-1 996/016948).

The phosphorus/nitrogen flame retardants are preferably reaction products of melamine with phosphoric acids or condensed phosphoric acids, or reaction products of condensation products of melamine with phosphoric acid or condensed phosphoric acids, or else mixtures of the products specified (WO1998/039306).

The phosphorus/nitrogen flame retardant is more preferably melamine polyphosphate.

The aforementioned components and components D and E can be incorporated into the plastics in highly varying process steps. For instance, it is possible in the case of polyamides or polyesters to incorporate the components into the polymer melt as early as the beginning, or at the end, of the polymerization/polycondensation or in a following compounding operation. In addition, there are processing operations in which the components are not added until later. This is practiced in particular when pigment or additive masterbatches are used. There is also the possibility of drum application, especially of pulverulent additives, to the polymer granules which may possibly still be warm as a result of the drying operation.

The flame retardant-stabilizer combination is preferably present as granules, flakes, fine particles, powder and/or micronized material.

The flame retardant-stabilizer combination is preferably present as a physical mixture of the solids, as a melt mixture, as compacted material, as an extrudate or in the form of a masterbatch.

The flame retardant-stabilizer combination is preferably produced by dry mixing components A, B, C, D and/or E.

The flame retardant-stabilizer combination is preferably produced by precipitating components A, B, C, D and/or E.

The flame retardant-stabilizer combination is preferably produced by mixing components A, B, C, D and/or E using liquid processing aids.

Preferred liquid processing aids are water, solvents, polymer additives having melting points of 0 to 150° C.

Suitable mixers may be: plowshare mixers from the company Lödige, rotating-disc mixers from the company Lödige, (e.g. CB30), Flexomix mixers from the company Schugi, HEC rotating-disc mixers from the company Niro, rotating-disc mixers (e.g. K-TTE4) from the company Drais, Mannheim, Eirich mixers (e.g. R02), Telschig mixers (WPA6), zig-zag mixers from the company Niro. Suitable temperatures for the mixing are from 20 to 200° C.

If liquid processing aids are used the product mixture can be dried in a suitable dryer, or heat-treated to enlarge the particles. Dryers of the invention may be: fluidized-bed dryers from the company Hosokawa Schugi (Schugi Fluid-Bed, Vometec fluidized-bed dryers), fluidized-bed dryers from the company Waldner or from the company Glatt, turbo-fluidized-bed dryers from the company Waldner, spin-flash dryers from the company Anhydro, or else drum dryers.

Preferred operating conditions in the fluidized-bed dryer are: air inlet temperature from 120 to 280° C., product temperature from 20 to 200° C.

Preferred solvents are acetone, methyl ethylketone, alcohols, water, benzene, toluene, xylene, esters, dimethyl formamide, alkyl glycols, propylene glykolmethyletheracetate, diethylene glycolethyletheracetate, polyethylene glycoldimethylether, ethyl acetate, butyl acetate, ethers such as dioxane, tetrahydrofurane, diethyl ether, methyl-tert.-butyl ether, alkanes e.g. n-dodecane, paraffines, cycloalkanes, N-methyl-pyrrolidone, carbonic acid such as acetic acid, acetic acid anhydride, formic acid, propionic acid, gasolines, white spirit, amyl acetate, pyridine, carbon sulfide, dimethyl sulfoxide, dichlor methane, chloroform, tetrachlorcarbon, nitro methane, N-dimethyl acetamide, nitro benzene, triethyl phosphate, triaryl phosphate, resorcinol diphosphoric acid tetraphenylester, dimethyl methylphosphonate, phosphonate ester, phosphoric acid ester, phosphoric acid pyroester, alkyl phosphonic acids and/or their oxalkylated derivatives.

The dialkylphosphinate has a moisture content of between 0.01 wt.-% and 10 wt.-%.

The dialkylphosphinate has a particle size of between 1 μm and 100 μm.

The dialkylphosphinate has a bulk density of between 100 g/L and 1000 g/L.

The dialkylphosphinate has a tap density of between 200 g/L and 1100 g/L.

The component B—has a moisture content of between 0.01 wt.-% and 10 wt.-%.

The component B—has a particle size of between 1 μm and 100 μm.

The component B—has a bulk density of between 100 g/L and 1000 g/L.

The component B—has a tap density of between 200 g/L and 1100 g/L.

The component C has a moisture content of between 0.01 wt.-% and 10 wt.-%.

The component C has a particle size of between 1 μm and 100 μm.

The component C has a bulk density of between 100 g/L and 1000 g/L.

The component C has a tap density of between 200 g/L and 1100 g/L.

The component D has a moisture content of between 0.01 wt.-% and 10 wt.-%.

The component D has a particle size of between 1 μm and 100 μm.

The component D has a bulk density of between 100 g/L and 1000 g/L.

The component D has a tap density of between 200 g/L and 1100 g/L.

The component E has a moisture content of between 0.01 wt.-% and 10 wt.-%.

The component E has a particle size of between 1 μm and 100 μm.

The component E has a bulk density of between 100 g/L and 1000 g/L.

The component E has a tap density of between 200 g/L and 1100 g/L.

Preference is given to using the mixture in a molding composition of a polyamide or of a polyester. Suitable polyamides are described, for example, in DE-A-199 20 276.

The polyamides are preferably those of the amino acid type and/or of the diamine and dicarboxylic acid type.

The polyamides are preferably Polyamide-6 and/or Polyamide-6,6.

The polyamides are preferably unmodified, colored, filled, unfilled, reinforced, unreinforced, or else otherwise modified.

The polyesters are preferably polyethylene terephthalate or polybutylene phthalate.

The polyesters are preferably unmodified, colored, filled unfilled, reinforced, unreinforced or else otherwise modified.

Carbodiimides may additionally be present.

Optionally, further additives may be added to the polymers. Additives which may be added include waxes, light protectants, stabilizers, antioxidants, antistats or mixtures of such additives.

Stabilizers which may used with preference include phosphonites and phosphites or carbodiimides.

The aforementioned additives may also be added to the flame retardant-stabilizer combination.

EXAMPLES

1. Component s Used
Standard Commercial Polymers (Granules):
PA 6,6 GF: Durethan® AKV 30 (Bayer AG, D), contains 30% glass fibers.
PBT GF: Celanex® 2300 GV1/30 (Ticona, D), contains 30% glass fibers.
PA 6: Ultramid® B 27 E
PA 6,6: Ultramid® A 27 E (BASF)
Glass fiber: PPG Glass fiber HP 3610 EC 10 4.5 mm
Flame Retardant Components (Pulverulent):
Component A: Aluminum salts of diethylphosphinic acid, referred to hereinbelow as DEPAL.
Component B: Melapur® 200 (melamine polyphosphate, MPP), from BASF
Component B: Aluminiumphosphite (AP) according to DE-A-102014001222
Component C1: Butylethyl phosphinic acid, aluminium salt
Component C2: Dibutyl phosphinic acid, aluminium salt
Component C3: Ethyl-phenylethyl phosphinic acid, aluminium salt
Component D1: Ethyl phosphonic acid, aluminium salt
Component D2: Butyl phosphonic acid, aluminium salt
Component E1: Phosphonic acid, aluminium salt 2. Production, Processing and Testing of Flame-Retardant Plastics Molding Compositions The flame-retardant component s were mixed with the polymer granules, lubricants and stabilizers in the ratio specified in the tables and incorporated in a Leistritz LSM 30/34 double-screw extruder at temperatures of from 260 to 310° C. (GFR PA-6,6) or from 240 to 280° C. (GFR PBT). The homogenized polymer strand was drawn off, cooled in a water bath and then granulated.

After sufficient drying, the molding compositions were processed to give test specimens on a Arburg 320 C Allrounder injection molding machine at temperatures of from 270 to 320° C. (GFR PA-6,6) or from 260 to 280° C. (GFR PBT) and, with the aid of the UL 94 test (Underwriter Laboratories), were tested for flame resistance and classified.

The flowability of the molding composition was determined by determining the melt volume index (MVR) at 275° C./2.16 kg. A sharp rise in the MVR value indicated polymer degradation.

The processing properties in polyester were assessed with reference to the specific viscosity (SV). After sufficient drying, the plastics molding composition granules were used to prepare a 1.0% solution in dichloroacetic acid and the SV value was determined. The higher the SV value is, the lower was the polymer degradation during the incorporation of the flame retardant.

Unless stated otherwise, all experiments of a particular series were carried out under identical conditions (temperature program, screw geometries, injection molding parameters, etc.) for the purpose of comparability.

Thus, for the inventive flame retardant-stabilizer combinations of components A, B, C, D and E an improvement in the angle of repose can be detected.

One can obtain an improvement in the angle of repose if only components A and C are used in the inventive flame retardant-stabilizer combination.

Unless stated otherwise, the amounts quoted are always in percent by weight.

In the present invention, angle of repose were used to evaluate the flowability of said dialkylphosphinate. For example, to measure the angle of repose, the powder sample was poured through a funnel and dropped down to a round plate with a radius of r. The powder was continuously poured into the funnel and accumulated into a cone-shaped pile growing up until the height of the pile did not increase. The height of the pile, h, was measured and the angle of repose, a, was calculated according to formula (1)

$$tg\alpha = h/r \quad (1)$$

The smaller α is, the better the flowability of the powder is. Generally, when α is smaller than 30°, the powder can flow freely; when α is between 30° and 40°, the powder can meet the processing requirements; when α is greater than 40°, the powder cannot meet the processing requirements.

Example 1 (Comparison)

A sample produced according to CN-A-104059101 was tested for its angle of repose. The result is listed in table 1.

Example 2

A flame retardant-stabilizer combination according to the invention was mixed from aluminiumdiethylphosphinate and component C1 in types and amounts according to table 1. It was tested for its angle of repose, the result is listed in table 1 and is better than comparative example 1.

Example 3

A flame retardant-stabilizer combination according to the invention was mixed from aluminiumdiethylphosphinate and component C1 in types and amounts according to table 1. It was tested for its angle of repose, the result is listed in table 1 and is better than comparative example 1.

Example 4

A flame retardant-stabilizer combination according to the invention was mixed from aluminiumdiethylphosphinate and component D1 in types and amounts according to table 1. It was tested for its angle of repose, the result is listed in table 1 and is better than comparative example 1.

Example 5

A flame retardant-stabilizer combination according to the invention was mixed from aluminiumdiethylphosphinate and component D1 in types and amounts according to table 1. It was tested for its angle of repose, the result is listed in table 1 and is better than comparative example 1.

Example 6

A flame retardant-stabilizer combination according to the invention was mixed from aluminiumdiethylphosphinate and component E1 in types and amounts according to table 1. It was tested for its angle of repose, the result is listed in table 1 and is better than comparative example 1.

Example 7

A flame retardant-stabilizer combination according to the invention was mixed from aluminiumdiethylphosphinate and component E1 in types and amounts according to table 1. It was tested for its angle of repose, the result is listed in table 1 and is better than comparative example 1.

Example 8

A flame retardant-stabilizer combination according to the invention was mixed from aluminiumdiethylphosphinate and components C1 and D1 in types and amounts according to table 1. It was tested for its angle of repose, the result is listed in table 1 and is better than comparative example 1.

Example 9

A flame retardant-stabilizer combination according to the invention was mixed from aluminiumdiethylphosphinate and components C2 and D2 in types and amounts according to table 1. It was tested for its angle of repose, the result is listed in table 1 and is better than comparative example 1.

Example 10

A flame retardant-stabilizer combination according to the invention was mixed from aluminiumdiethylphosphinate and components C1 and E1 in types and amounts according to table 1. It was tested for its angle of repose, the result is listed in table 1 and is better than comparative example 1.

Example 11

A flame retardant-stabilizer combination according to the invention was mixed from aluminiumdiethylphosphinate and components C2 and E1 in types and amounts according to table 1. It was tested for its angle of repose, the result is listed in table 1 and is better than comparative example 1.

Example 12

A flame retardant-stabilizer combination according to the invention was mixed from aluminiumdiethylphosphinate and components C1, D1 and E1 in types and amounts according to table 1. It was tested for its angle of repose, the result is listed in table 1 and is better than comparative example 1.

Example 13

A flame retardant-stabilizer combination according to the invention was mixed from aluminiumdiethylphosphinate and components C3, D2 and E1 in types and amounts according to table 1. It was tested for its angle of repose, the result is listed in table 1 and is better than comparative example 1.

Example 14

A flame retardant-stabilizer combination according to the invention was mixed from aluminiumdiethylphosphinate, component B and component C1 in types and amounts according to table 1. It was tested for its angle of repose, the very good result is listed in table 1.

Example 14a (Comparison)

A flame retardant-stabilizer combination was mixed from 66.5 wt.-% aluminiumdiethylphosphinate and 33.8 wt.-% component B. It was tested for its angle of repose of 35 degrees, which was worse than pure aluminiumdiethylphosphinate.

Example 15

A flame retardant-stabilizer combination according to the invention was mixed from aluminiumdiethylphosphinate, component B and component C1 in types and amounts according to table 1. It was tested for its angle of repose, the very good result is listed in table 1.

Example 16

A flame retardant-stabilizer combination according to the invention was mixed from aluminiumdiethylphosphinate, component B, component C1, component D1 and component E1 in types and amounts according to table 1. It was tested for its angle of repose, the very good result is listed in table 1.

Example 17

A flame retardant-stabilizer combination according to the invention was mixed from aluminiumdiethylphosphinate, component B, component C1, component D2 and component E1 in types and amounts according to table 1. It was tested for its angle of repose, the very good result is listed in table 1.

Example 18

A flame retardant-stabilizer combination according to the invention was mixed from aluminiumdiethylphosphinate, component B, component C1 and component D1 in types and amounts according to table 1. It was tested for its angle of repose, the very good result is listed in table 1.

Example 18a (Comparison)

A flame retardant-stabilizer combination was mixed from 82.1 wt.-% aluminiumdiethylphosphinate and 17.9 wt.-% component B. It was tested for its angle of repose of 30 degrees, which was worse than pure aluminiumdiethylphosphinate.

Example 19

A flame retardant-stabilizer combination according to the invention was mixed from aluminiumdiethylphosphinate, component B, component C1 and component D2 in types and amounts according to table 1. It was tested for its angle of repose, the very good result is listed in table 1.

TABLE 1

Compositions of flame retardant-stabilizer combinations and angles of repose

| Example | Aluminium-phosphinate [wt.-%] | component B [wt.-%] | | component C [wt.-%] | | component D [wt.-%] | | component E [wt.-%] | | Angle of repose [°] |
|---|---|---|---|---|---|---|---|---|---|---|
| 1 (Com) | 100 | — | — | — | — | — | — | — | — | 25 |
| 2 | 99.9 | — | — | C1 | 0.1 | — | — | — | — | 23 |
| 3 | 80 | — | — | C1 | 20 | — | — | — | — | 24.9 |
| 4 | 99.99 | — | — | — | — | D1 | 0.01 | — | — | 22.9 |
| 5 | 95 | — | — | — | — | D1 | 5 | — | — | 24 |
| 6 | 99.99 | — | — | — | — | — | — | E1 | 0.01 | 23.2 |
| 7 | 95 | — | — | — | — | — | — | E1 | 5 | 24.5 |
| 8 | 99.69 | — | — | C1 | 0.3 | D1 | 0.01 | — | — | 24.1 |
| 9 | 93 | — | — | C2 | 5 | D2 | 2 | — | — | 24.7 |
| 10 | 99.69 | — | — | C1 | 0.3 | — | — | E1 | 0.01 | 24.2 |
| 11 | 94.7 | — | — | C2 | 5 | — | — | E1 | 0.3 | 24.5 |
| 12 | 99.68 | — | — | C1 | 0.3 | D1 | 0.01 | E1 | 0.01 | 24.3 |
| 13 | 97.75 | — | — | C3 | 2 | D2 | 0.05 | E1 | 0.2 | 24.5 |
| 14 | 66.2 | MPP | 32.6 | C1 | 1.2 | — | — | — | — | 27 |
| 15 | 63.7 | MPP | 31.4 | C1 | 5 | — | — | — | — | 30 |
| 16 | 66.2 | MPP | 32.6 | C1 | 1.2 | D1 | 0.03 | E1 | 0.01 | 26 |
| 17 | 62.5 | MPP | 30.9 | C1 | 5 | D2 | 1.5 | E1 | 0.2 | 27 |
| 18 | 81.5 | AP | 17.9 | C1 | 0.6 | D1 | 0.05 | — | — | 26 |
| 19 | 80.0 | AP | 17.6 | C1 | 1.4 | D2 | 1 | — | — | 26 |

Example 20

An inventive flame-retardant molding composition comprising the combination of aluminiumdiethylphosphinate, component B, component C1 and zinc borate in glass fiber-reinforced PA-6 was produced in the composition according to table using a melt temperature on injection molding of 290° C.

Example 21

An inventive flame-retardant molding composition comprising the combination of aluminiumdiethylphosphinate, component C3, component D2, component E1 and zinc borate in glass fiber-reinforced PA-6,6 was produced in the composition according to table using a melt temperature on injection molding of 300° C.

Example 22

An inventive flame-retardant molding composition comprising the combination of aluminiumdiethylphosphinate, component B, component C1, component D1, component E1 in glass fiber-reinforced PA-6,6 was produced in the composition according to table using a melt temperature on injection molding of 300° C.

Example 23

An inventive flame-retardant molding composition comprising the combination of aluminiumdiethylphosphinate, component B, component C1, component D1, component E1 in glass fiber-reinforced PA-6,6 was produced in the composition according to table using a melt temperature on injection molding of 300° C.

Example 24

An inventive flame-retardant molding composition comprising the combination of aluminiumdiethylphosphinate, component B, component C1, component D1, component E1 in glass fiber-reinforced PA-6,6 was produced in the composition according to table using a melt temperature on injection molding of 300° C.

Example 25

An inventive flame-retardant molding composition comprising the combination of aluminiumdiethylphosphinate, component B and component C in glass fiber-reinforced PBT was produced in the composition according to table using a melt temperature on injection molding of 275° C.

In general the angle of repose of aluminiumdiethylphosphinate plus components C and/or D and/or E are better than of pure aluminiumdiethylphosphinate (comparison example).

The angle of repose of aluminiumdiethylphosphinate plus components B and C and/or D and/or E are better than of aluminiumdiethylphosphinate plus components B (comparison example 14a, 18a).

The invention claimed is:

1. A flame retardant-stabilizer combination for thermoplastic polymers, comprising, as component A, from 25 to 99.7% by weight of a phosphinic acid salt of the formula (I)

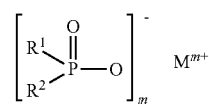

(I)

wherein
R$^1$, R$^2$ are the same or different and are each methyl, ethyl, n-propyl or isopropyl,
M is Mg, Ca, Al, Sb, Sn, Ge, Ti, Zn, Fe, Zr, Ce, Bi, Sr, Mn, Li, Na, K and/or a protonated nitrogen base;
m is from 1 to 4;
as component B, from 0.1 to 75% by weight of a synergist or of a phosphorus/nitrogen flame retardant selected from the group consisting of:
  a) condensation products of melamine,
  b) reaction products of melamine with polyphosphoric acid, reaction products of condensation products of melamine with polyphosphoric acid and mixtures thereof, as component C, from 0.1 to 10% by weight of telomeric phosphinic acid salts of formula (XIII)

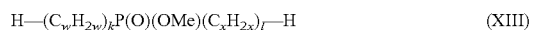

(XIII)

where, in formula (XIII), independently from each other,
k is from 1 to 3,
l is from 1 to 3,
w is from 2 or 3,
x is from 2 or 3,
Me is minimum one of the cations of the group Mg, Ca, Al, Sb, Sn, Ge, Ti, Fe, Zr, Zn, Ce, Bi, Sr, Mn, Li, Na and/or K,
as component D, from 0.1 to 5% by weight of organo phosphonic acid salt, and
as component E, from 0 to 1% by weight of phosphonic acid salt, the sum of the components always being 100% by weight, and

TABLE 2

Compositions of flame-retardant molding compositions and test results

| Example | Polymer Type | Polymer [wt.-%] | Glas fiber (calc.) [wt.-%] | Zinc borate [wt.-%] | Flame retard.-stab. comb acc. to exp. | Flame retard.-stab. comb [wt.-%] | UL 94 class (0.8 mm) [-] |
|---|---|---|---|---|---|---|---|
| 20 | PA 6 | 52 | 30 | 0.72 | 14 | 18 | V-0 |
| 21 | PA 6, 6 | 80 | 0 | 0.8 | 13 | 20 | V-0 |
| 22 | PA 6, 6 | 72 | 10 | — | 16 | 18 | V-0 |
| 23 | PA 6, 6 GF | 82 | (24.6) | — | 18 | 18 | V-0 |
| 24 | PA 6, 6 | 42 | 40 | — | 16 | 18 | V-0 |
| 25 | PBT GF | 82 | (24.6) | — | 16 | 18 | V-0 | wherein the angle of repose of said flame retardant-stabilizer combination is between 5° and 45°, and wherein the tap density of said flame retardant-stabilizer combination is between 200 g/L and 1100 g/L.

2. The flame retardant-stabilizer combination as claimed in claim 1, wherein the angle of repose of said flame retardant-stabilizer combination is between 20° and 40°.

3. The flame retardant-stabilizer combination as claimed in claim 1, wherein M is a calcium, aluminum, zinc, titanium or iron ion.

4. The flame retardant-stabilizer combination as claimed in claim 1, wherein component B is melamine polyphosphate.

5. The flame retardant-stabilizer combination as claimed in claim 1, wherein Me is a cation of the group Al, Ti, Fe and/or Zn.

6. The flame retardant-stabilizer combination as claimed in claim 1, wherein component D is alkyl phosphonate according to formula (II)

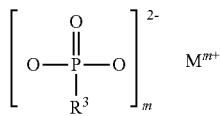

(II)

wherein $R^3$ is an ethyl, propyl and/or butyl group, M is Mg, Ca, Al, Zn or Fe and m is from 1 to 4.

7. The flame retardant-stabilizer combination as claimed in claim 1, wherein component E is a phosphite according to formula (IX);

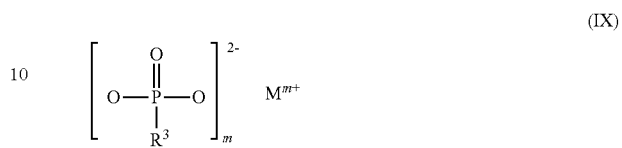

(IX)

wherein $R^3$ is H, M is Mg, Ca, Al, Zn or Fe and m is from 1 to 4.

8. The flame retardant-stabilizer combination as claimed in claim 1, wherein the residual moisture content of said flame retardant-stabilizer combination is between 0.01 wt.-% and 10 wt.-%.

9. The flame retardant-stabilizer combination as claimed in claim 1, wherein the residual moisture content of said flame retardant-stabilizer combination is between 0.1 wt.-% and 1 wt.-%.

10. The flame retardant-stabilizer combination as claimed in claim 1, wherein the bulk density of said flame retardant-stabilizer combination is between 100 g/L and 1000 g/L.

* * * * *